United States Patent (10) Patent No.: US 10,000,146 B2
Vipond                                  (45) Date of Patent:      Jun. 19, 2018

(54) ADJUSTABLE AND COLLAPSIBLE APPARATUS FOR LOADING AND UNLOADING PICKUP TRUCK CARGO BEDS

(71) Applicant: Ryan Robert Vipond, Morden (CA)

(72) Inventor: Ryan Robert Vipond, Morden (CA)

( * ) Notice: Subject to any disclaimer, the term of this patent is extended or adjusted under 35 U.S.C. 154(b) by 13 days.

(21) Appl. No.: 15/247,262

(22) Filed: Aug. 25, 2016

(65) Prior Publication Data

US 2017/0057395 A1    Mar. 2, 2017

Related U.S. Application Data

(60) Provisional application No. 62/213,447, filed on Sep. 2, 2015.

(51) Int. Cl.
*B62D 25/00* (2006.01)
*B60P 1/43* (2006.01)
*B62D 33/027* (2006.01)

(52) U.S. Cl.
CPC .......... *B60P 1/435* (2013.01); *B62D 33/0273* (2013.01)

(58) Field of Classification Search
CPC ............. A61H 3/00; A61H 2201/165; A61H 2201/1642; A61H 2201/5007; A61H 2201/164; B25J 9/0006
USPC ............................. 296/61, 26.08, 26.1, 26.11
See application file for complete search history.

(56) References Cited

U.S. PATENT DOCUMENTS

| | | | |
|---|---|---|---|
| 3,613,920 A | * | 10/1971 | Flamm ...................... B60P 1/43 296/3 |
| 3,687,314 A | | 8/1972 | Haugland |
| 3,720,335 A | * | 3/1973 | Ward ...................... B60P 1/433 414/469 |
| 3,757,972 A | * | 9/1973 | Martin .................... B60P 3/062 414/462 |
| 3,820,806 A | | 6/1974 | Cline et al. |
| 3,837,663 A | | 9/1974 | Ness |
| 3,977,545 A | * | 8/1976 | Lloyd ...................... B60P 1/431 296/61 |
| 4,990,049 A | * | 2/1991 | Hargrove ................ B60P 1/431 182/118 |
| 5,156,432 A | * | 10/1992 | McCleary ............... B60P 1/435 296/57.1 |
| 5,556,249 A | * | 9/1996 | Heine ................... B60P 1/6454 414/477 |

(Continued)

*Primary Examiner* — Kiran B Patel
(74) *Attorney, Agent, or Firm* — Kyle R Satterthwaite; Ryan W Dupuis; Ade & Company Inc.

(57) ABSTRACT

A loading apparatus for a tailgate-equipped cargo bed of a pickup truck features a cargo bed platform assembly, and a tailgate platform assembly pivotally connected to the rear end of the cargo bed platform assembly. The tailgate platform assembly is pivotable relative to the cargo bed platform assembly between a stowed position overlying the cargo bed platform assembly and a deployed position forming a rearward extension of the cargo bed platform. Between uses, the tailgate platform is storable in the cargo bed in a secured manner behind a closed tailgate. When needed, the tailgate is opened and the tailgate platform is folded down onto the open tailgate. An overall effective length of the apparatus is adjustable to fit different cargo bed sizes by extension of retraction of a longitudinal adjustment member that extends forwardly from the cargo bed platform to abutting against a front wall of the cargo bed.

16 Claims, 8 Drawing Sheets

(56) References Cited

U.S. PATENT DOCUMENTS

| | | | | |
|---|---|---|---|---|
| 5,570,989 A * | 11/1996 | Belanger | ................ | B60P 1/431 414/522 |
| 6,389,629 B1 * | 5/2002 | Schouest | ................ | B60P 1/43 119/849 |
| 6,725,487 B2 * | 4/2004 | Myrick | ................ | B60P 1/43 119/847 |
| 6,802,552 B2 * | 10/2004 | Hunt | ................ | B60J 5/108 296/57.1 |
| 7,299,517 B1 * | 11/2007 | Adinolfe | ................ | B65G 69/30 14/69.5 |
| 7,445,268 B2 * | 11/2008 | Faulkiner | ................ | B60P 1/431 296/183.1 |
| 7,533,923 B1 * | 5/2009 | Caldwell | ................ | B60P 1/431 296/61 |
| 7,827,641 B2 * | 11/2010 | Hoffman | ................ | B65G 69/30 14/69.5 |
| 7,971,919 B2 * | 7/2011 | Vertanen | ................ | B60P 3/40 296/3 |
| 8,061,754 B1 * | 11/2011 | Webb | ................ | B60P 3/122 14/71.1 |
| 8,292,565 B1 * | 10/2012 | Ruff | ................ | B60P 1/43 14/71.1 |
| 9,085,258 B2 * | 7/2015 | Patterson | ................ | B60P 3/07 |
| 9,670,013 B2 * | 6/2017 | Parrish | ................ | B65G 69/30 |
| 2002/0109368 A1 * | 8/2002 | Mink | ................ | B60P 1/003 296/26.13 |
| 2002/0172584 A1 * | 11/2002 | Huggins | ................ | B60P 1/435 414/537 |
| 2005/0196260 A1 | 9/2005 | Asfeld | | |
| 2007/0092363 A1 * | 4/2007 | Morfitt | ................ | B60P 1/433 414/467 |
| 2009/0102216 A1 * | 4/2009 | Hanzel | ................ | B60P 1/26 296/26.11 |
| 2010/0068020 A1 | 3/2010 | Asfeld | | |
| 2011/0072596 A1 * | 3/2011 | Kenny | ................ | B60P 1/435 14/69.5 |
| 2013/0028693 A1 * | 1/2013 | Justak | ................ | B60P 1/435 414/480 |
| 2013/0094930 A1 * | 4/2013 | Kalergis | ................ | B60P 1/43 414/523 |
| 2013/0223963 A1 * | 8/2013 | Kramlick | ................ | B60P 1/431 414/537 |
| 2013/0294873 A1 * | 11/2013 | Chastain, Jr. | ................ | B60P 1/435 414/523 |
| 2014/0328658 A1 * | 11/2014 | Verwys | ................ | B60P 3/06 414/537 |
| 2014/0338137 A1 * | 11/2014 | Stokes | ................ | B60D 1/06 14/71.1 |
| 2015/0175079 A1 * | 6/2015 | Kmita | ................ | B60R 3/007 280/166 |
| 2016/0144759 A1 * | 5/2016 | DiBlasio | ................ | B60P 1/435 414/537 |
| 2016/0185273 A1 * | 6/2016 | Aftanas | ................ | B65G 69/30 280/164.1 |

\* cited by examiner

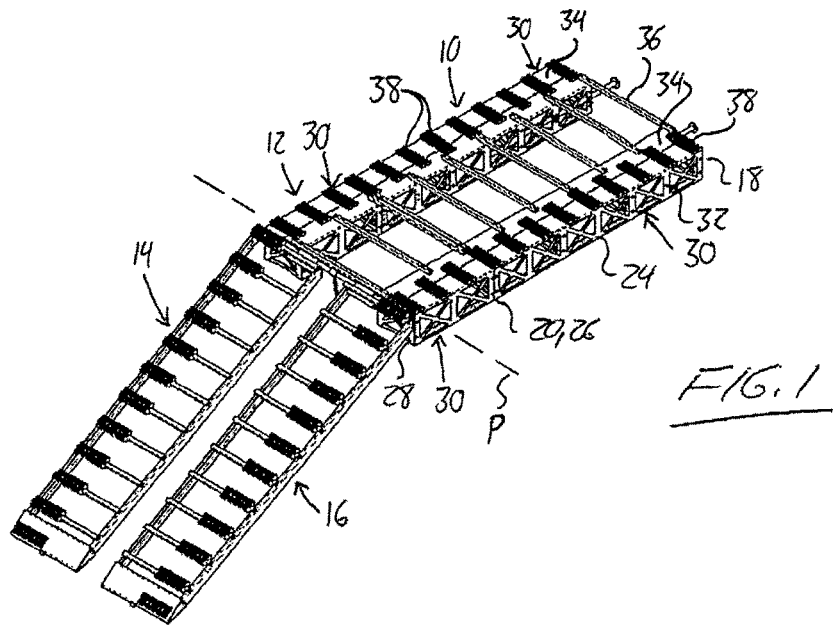
FIG. 1
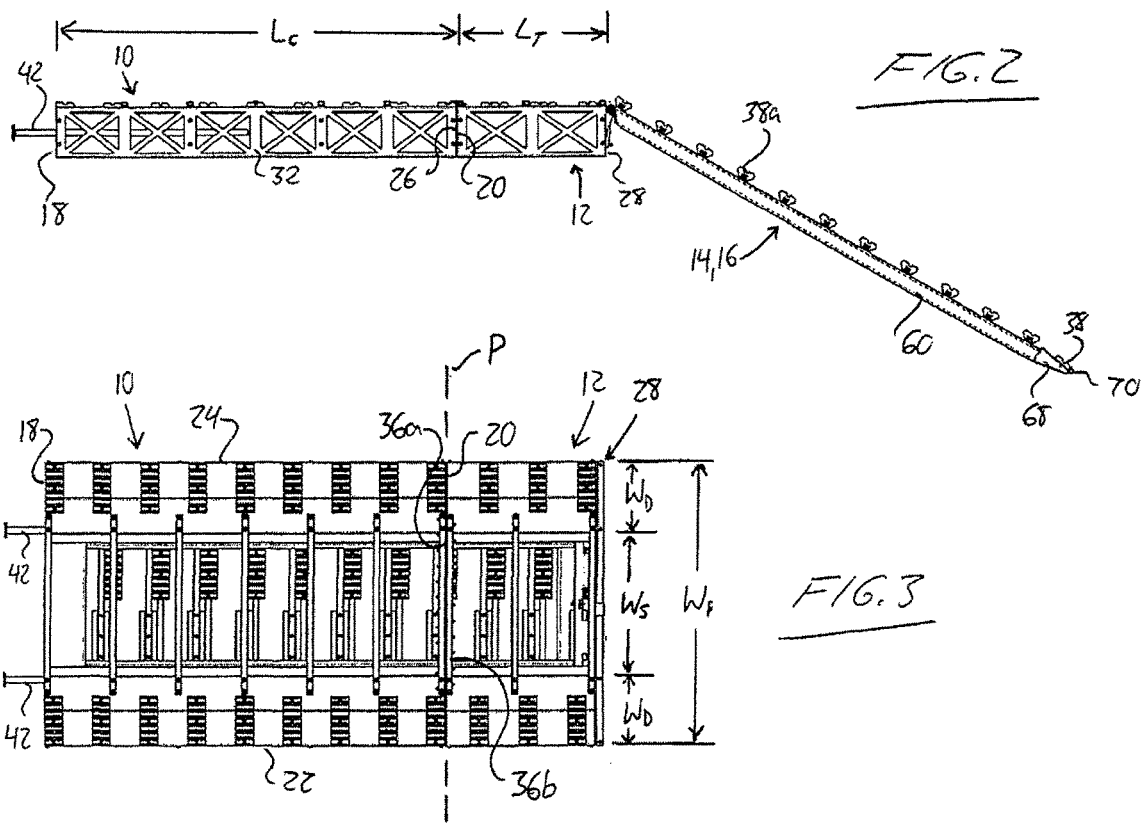
FIG. 2
FIG. 3

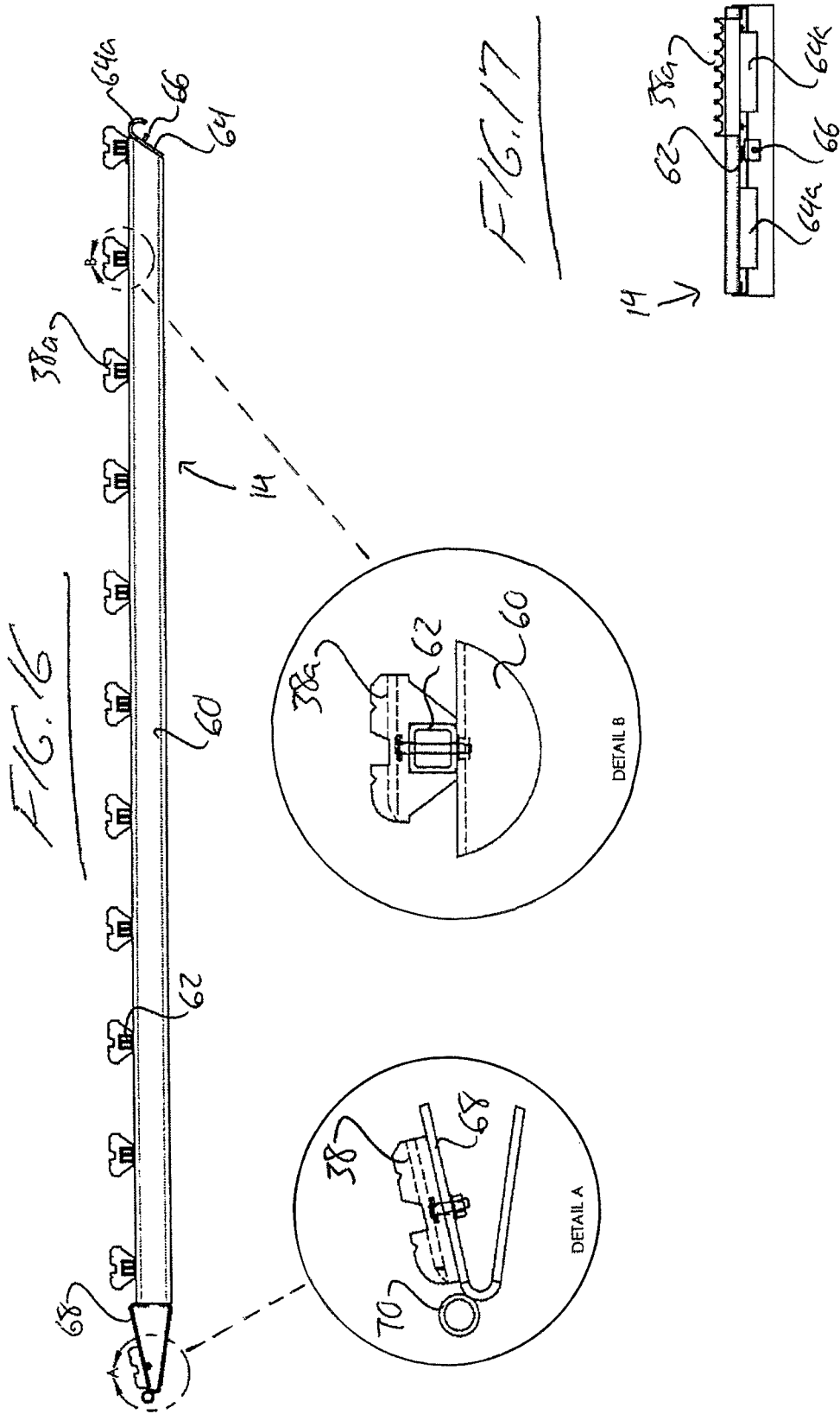

ADJUSTABLE AND COLLAPSIBLE APPARATUS FOR LOADING AND UNLOADING PICKUP TRUCK CARGO BEDS

CROSS REFERENCE TO RELATED APPLICATIONS

This application claims benefit under 35 U.S.C. 119(e) of Provisional Application Ser. No. 62/213,447, filed Sep. 2, 2015, the entirety of which is incorporated here by reference.

FIELD OF THE INVENTION

The present invention relates generally to loading ramps, and more particularly to loading ramps suitable for loading all-terrain vehicles (ATVs), snowmobiles, or other vehicles or equipment into the rear cargo bed of a pickup truck.

BACKGROUND

There have been many loading devices proposed in the prior art for aiding in the process of loading and unloading snowmobiles and ATVs into and out of the cargo bed of a pickup truck, examples of which can be seen in U.S. Pat. Nos. 3,613,920, 3,687,314, 3,720,335, 3,820,806, 3,837,663 and 3,977,545, and U.S. Patent Application Publications 2005/0196260 and 2010/0068020.

However, there remains room for improvement.

Disclosed herein is an improved loading apparatus with unique solutions for accommodating varying cargo bed dimensions among different pickup truck models, and allowing closing of the tailgate without requiring full removal of the apparatus from the vehicle.

SUMMARY OF THE INVENTION

According to one aspect of the invention, there is provided a loading apparatus for use in loading and unloading a tailgate-equipped cargo bed of a pickup truck, the apparatus comprising:

a cargo bed platform assembly dimensioned to fit within the cargo bed of the pickup truck with a front end of said cargo bed platform assembly residing adjacent an operator cabin of the pickup truck, a rear end of said cargo bed platform assembly residing adjacent a tailgate of the cargo bed of said pickup truck, and opposing sides of the cargo bed platform assembly residing respectively adjacent opposing side walls of the cargo bed of said pickup truck, the cargo bed platform having a cargo bed platform length measured between said front and rear ends thereof in a longitudinal direction and a cargo bed platform width measured between said opposing sides of the cargo bed platform in a transverse direction perpendicular to said longitudinal direction;

a tailgate platform assembly having a connection end that is coupled to the rear end of the cargo bed platform assembly by a pivotal connection that defines a pivot axis parallel to the width dimension of the cargo bed platform assembly, and a free end disposed opposite the connection end, the tailgate platform assembly being pivotal about the pivot axis relative to the cargo bed platform assembly between a stowed position overlying the cargo bed platform assembly and a deployed position forming an extension of the cargo bed platform that reaches from the rear end thereof in the longitudinal direction;

whereby the tailgate platform is storable in the cargo bed of the pickup truck in the stowed position with the tailgate closed when the loading apparatus is not in use, and is pivotally deployable from the stowed position into a deployed position residing atop the tailgate when opened, whereupon placement of one or more ramp members in a useable position sloping upward to the tailgate platform assembly from the ground prepares the pickup truck for loading or unloading of the cargo bed.

Preferably the apparatus comprises a pair of ramp members that are each connectable to the free end of the tailgate platform assembly, the cargo bed platform assembly comprises two cargo bed track assemblies spaced apart from one another in the transverse direction to create a cargo bed space therebetween, the tailgate platform assembly comprises two tailgate track assemblies spaced apart from one another in the transverse direction to create a tailgate space therebetween, and, with the tailgate platform assembly in the deployed position, the cargo bed space and the tailgate space combine to form a storage space that is sufficiently sized to receive the pair of ramp members therein.

Preferably the ramp members each have a ramp width and a ramp length, and a width of each of the tailgate space and the cargo bed space is greater than the ramp width of each ramp member, whereby the cargo bed space and the tailgate space combine to form a storage space that accommodates said ramp members when the tailgate platform is deployed.

Preferably a height dimension of each of the tailgate space and the cargo bed space is at least two times greater than a ramp thickness of each ramp member that is measured perpendicular to the ramp width and perpendicular to the ramp length, whereby the storage space accommodates receipt of the ramp members in a stacked configuration one atop the other.

Preferably a retaining member is connected to the tailgate platform assembly at the free end thereof and is selectively movable into an out of a useful position for maintaining the ramp members within the storage space once placed therein.

Preferably the retaining member comprises a coupling feature for connecting to at least one of the ramp members when received in the storage space.

Preferably the coupling feature is arranged to connect to a lower one of the two ramp members when stacked atop one another within the storage space, with the retaining member spanning downward past an upper one of the stacked ramp members to connect to the lower one of the stacked ramp members, thereby blocking the upper one of the stacked ramp members from sliding off the lower one of the stacked ramp members.

Preferably the coupling feature of the retaining member comprises a hook hanging downwardly from a cross-member that spans over the tailgate space of the tailgate platform assembly for engagement through a cooperating hook-receiving opening on one of the ramp members.

Preferably the hook is movably connected to the cross-member for movement into and out of a position engaging the cooperating hook-receiving opening.

Preferably the hook is an L-shaped member attached to a sliding collar that is slidable back and forth on the cross-member.

Preferably the cross-member is located at the free end of the tailgate platform assembly and comprises a rounded topside, and each ramp member comprises at least one curved hook at a respective end thereof for engaging over the curved topside of the cross-member in order to hook the ramp member to the tailgate platform assembly in the useful position sloping down to the ground from said free end of the tailgate platform assembly.

Preferably there is a lock pin for selectively securing a connection of the coupling feature with the at least one of the ramp members.

The cross-member may be slidably supported for movement back and forth across the free end of the tailgate platform in the transverse direction into and out of a lockable normal position spanning across an upper area of the tailgate space.

A stacked height of the ramp members when stacked atop one another may exceed a height at which the cross-member is supported in the lockable normal position, whereby the lockable normal position of the cross-member blocks exit of an upper one of two stacked ramp members received in the storage space.

According to another aspect of the invention, there is provided a loading apparatus for use in loading and unloading a tailgate-equipped cargo bed of a pickup truck, the apparatus comprising:

a platform assembly dimensioned to fit within the cargo bed of the pickup truck with a rear end of said cargo bed platform assembly residing adjacent a tailgate area of the cargo bed of said pickup truck, an opposing front end of said platform assembly residing in the cargo bed of the pickup truck at a location between the tailgate area and an operator cabin of the pickup truck, the front and rear ends of the platform assembly being spaced apart from one another in a longitudinal direction;

at least one ramp member arranged to connect to the platform assembly in a manner creating a ramp that slopes upward to the platform assembly from the ground to prepare the pickup truck for loading or unloading; and at least one longitudinal adjustment member movably connected to the platform assembly and selectively displaceable back and forth in the longitudinal direction relative to said platform assembly to adjust a distance by which said longitudinal adjustment member projects forwardly from the front end of the platform assembly, thereby adjusting an overall effective length of the platform assembly and connected adjustment member, whereby the overall effective length can be set to match a cargo bed length measured from a front wall of the cargo bed behind the operator cabin to the tailgate area in order to place the rear end of the platform assembly at said tailgate area when the adjustment member is abutted against the front wall of the cargo bed.

The apparatus may used in combination with one or more securing members each connectable between the platform assembly and a tie-down anchor of the cargo in order to pull the platform assembly toward the operator cabin and maintain abutment of the at least one adjustment member against the front wall of the cargo bed.

Preferably the one or more securing members comprise one or more ratchet straps.

BRIEF DESCRIPTION OF THE DRAWINGS

Preferred embodiments of the invention will now be described in conjunction with the accompanying drawings in which:

FIG. 1 is a perspective view of a loading/unloading apparatus of the present invention featuring a cargo bed platform, a hinged tailgate platform and a pair of ramp members, with the tailgate platform shown in a deployed position with the ramp members attached, whereby the apparatus is in a ready-position for loading or unloading the cargo bed of a pickup truck.

FIG. 2 is a side elevational view of the loading/unloading apparatus of FIG. 1.

FIG. 3 is an overhead plan view of the loading/unloading apparatus with the tailgate platform in the deployed position and the ramp members stored within a storage space of the cargo bed and tailgate sections, whereby the apparatus is in a transport position for carrying a snowmobile, ATV or the like in the cargo bed of the pickup truck.

FIG. 16 is a side elevational view of the ramp member of FIG. 14.

FIG. 17 is an end view of the ramp member of FIG. 14.

In the drawings like characters of reference indicate corresponding parts in the different figures.

DETAILED DESCRIPTION

Figure 4:
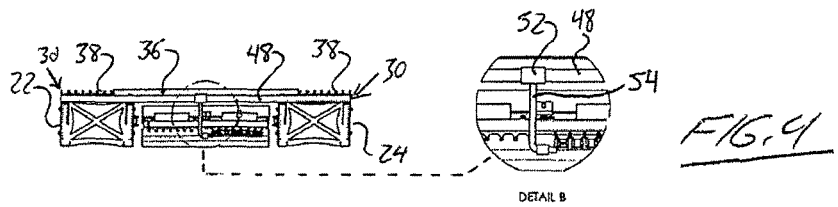
FIG. 4 is a rear-end elevational view of the loading/unloading apparatus of FIG. 3.

FIGS. 1 to 5 illustrate a loading/unloading apparatus for loading and unloading ATVs and snowmobiles into and out of the tailgate-equipped cargo bed of a conventional pickup truck. FIGS. 1 and 2 illustrate the apparatus in a state ready for the loading or unloading process, FIGS. 3 and 4 illustrate the apparatus in a transport condition for carrying the ATV or snowmobile atop the apparatus in the bed of the truck.

With reference to FIGS. 1 and 2, the apparatus features a cargo bed platform 10, a tailgate platform 12 connected thereto, and a pair of ramp members 14. The installed cargo bed platform 10 sits atop the floor of the pickup truck's cargo bed 100 with a front end 18 of the cargo bed platform 10 residing at or near a front wall 106 of the cargo bed located immediately behind the operator cabin of the truck. A rear end of the cargo bed platform 10 resides at or near the tailgate area at the rear ends of the cargo bed side walls 108, where the truck's tailgate 110 is pivotally supported for swinging movement between an open position laying coplanar with the cargo bed floor and a closed position standing upright between the rear ends of the two side walls to close off the rear end of the cargo bed. A width W of the cargo bed platform 10 measured between two opposing sides 22, 24 thereof that perpendicularly interconnect the front and rear ends 18, 20 is equal to or slightly less than a minimum available width of the cargo bed floor, which would normally be measured between wheel wells of the truck's rear wheels. A length $L_C$ of the cargo bed platform 10 measured between the opposing front and rear ends 18, 20 thereof is thus equal to or less than a corresponding length of the cargo bed measured between the front wall of the cargo bed and closed tailgate thereof, whereby the cargo bed platform 10 fits entirely within the cargo bed, thus still allowing closure of the tailgate when the cargo bed platform 10 is installed.

Figure 18:
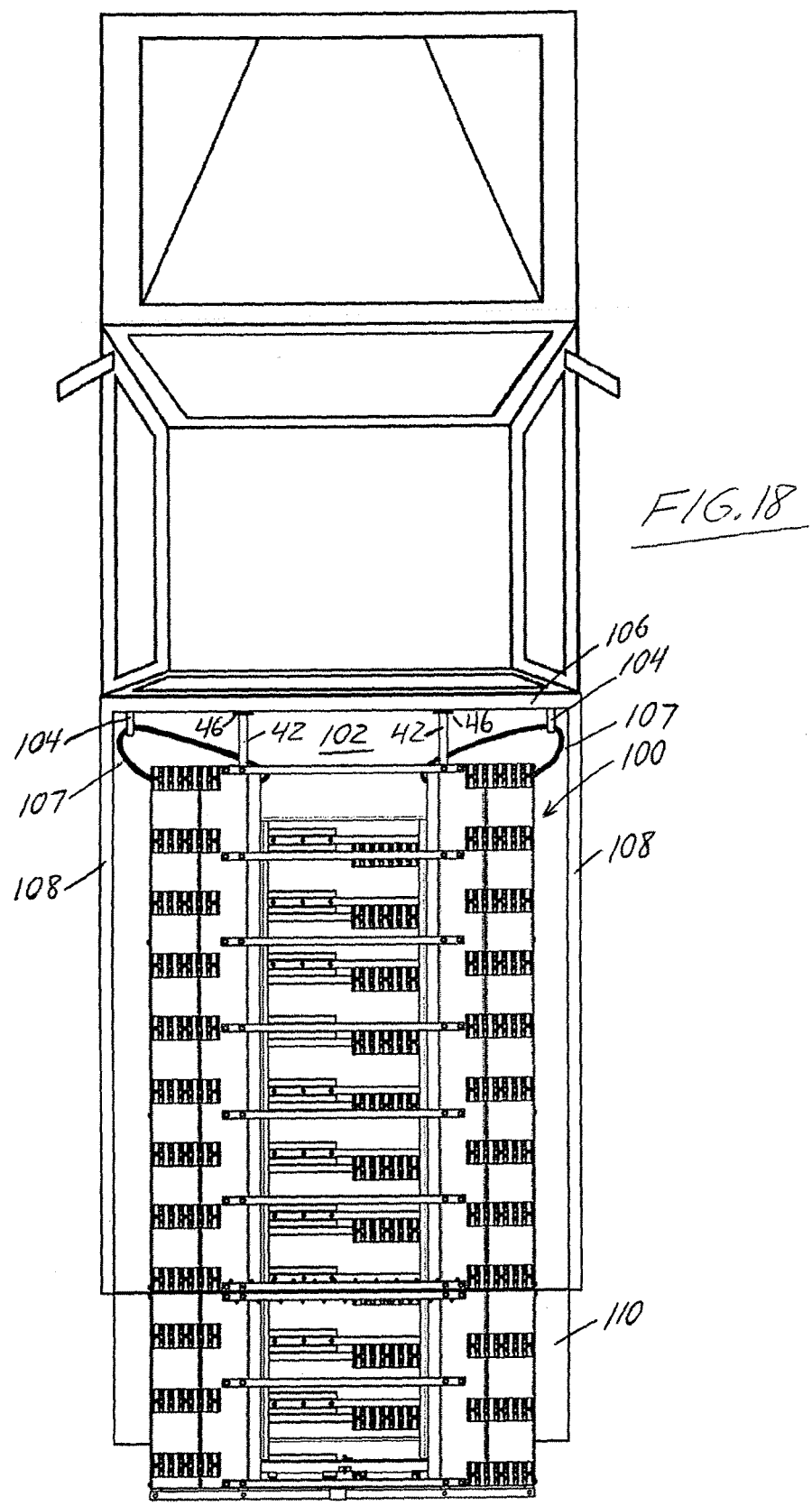
FIG. 18 is an overhead plan view of the loading/unloading apparatus installed in the cargo bed of a pickup truck, with the tailgate of the cargo bed open and the cargo bed platform of the apparatus lowered into the deployed position atop the open tailgate.

The tailgate platform 12 has a connection end 26 at which it is hinged to the rear end 20 of the cargo bed platform to allow relative pivoting between the two platforms about a horizontal pivot axis P that lies widthwise to the platforms 10, 12 (i.e. parallel to the cargo bed platform width W, and perpendicular to the cargo bed platform length $L_C$). As a result, a movable free end 28 of the tailgate platform 12 can be swung about this pivot axis P relative to the stationary cargo bed platform 10 that is secured in place on the cargo bed floor. FIGS. 1 and 2 show the tailgate platform 12 in a deployed position in which the topsides of the two platforms lie coplanar with one another, and the connection end 26 of the tailgate platform lies adjacent to the rear end 20 of the cargo bed platform in abutting contact or close proximity therewith. In the deployed position, the tailgate platform 12 thus forms an in-line extension of the cargo bed platform 10 in the longitudinal direction in which the cargo bed platform length $L_C$ is measured. To accommodate this, the tailgate 110 of the truck must be in the open position in order for the tailgate platform 12 to sit atop the open tailgate in the deployed position, as shown in FIG. 18.

Figure 5:
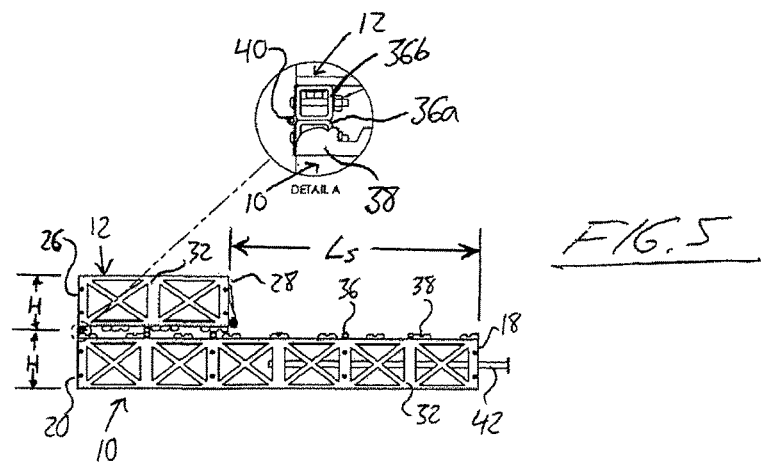
FIG. 5 is a side elevational view of the loading/unloading apparatus with the tailgate platform in a stowed position folded back over the cargo bed platform so as to position both platforms fully within the cargo bed in a manner allowing closure of the tailgate.

FIG. 5 shows the tailgate platform 12 in a stowed position, having been pivoted upward and over-center about the pivot axis P from the deployed position so as to rest atop the cargo bed platform 10 in parallel relation thereto. In this position, the connection end 26 of the tailgate platform 12 lies coplanar with the rear end 20 of the cargo bed platform 10 in a position thereabove, and the free end 28 of the tailgate platform lies overtop of the cargo bed platform 10 at an intermediate position between the front and rear ends 18, 20 thereof. This acts to retract the tailgate platform into the cargo bed space from its previous deployed position extending out from the cargo space over the open tailgate. Accordingly, the stowed position of the tailgate platform 12 allows the tailgate to be closed. The tailgate platform can be stowed in this manner when a snowmobile or ATV is not parked atop the apparatus in the cargo bed of the vehicle, whereupon closure of the tailgate reduces the visibility of the platforms in order to reduce the potential for theft thereof. The equal height H of the two platforms is preferably less than half of the sidewall height of the cargo bed, whereupon no portion of either platform 10, 12 reaches above the top ends of the cargo bed walls, even when the tailgate platform is stowed atop the cargo bed platform. As a result, an optional tonneau cover of the pickup truck can be closed over the cargo bed and the platforms 10, 12 stowed therein, thus fully hiding the platforms from sight and further reducing the risk of theft, particularly when a lockable tonneau cover is used.

With reference to FIGS. 1 and 2, to prepare the apparatus for loading or unloading of a snowmobile or ATV, the tailgate platform 12 is deployed to sit atop the open tailgate of the pickup truck, thereby placing the free end 28 of the tailgate platform 12 near the distal end of the open tailgate that lies opposite the tailgate's hinged connection to the cargo bed sidewalls. At this point, each ramp member 14 is connected to the free end 28 of the tailgate platform, and the other end of each ramp member 14 is laid atop the ground, whereby the two ramp members 14 form two halves of a ramp that slopes obliquely upward from the ground to the tailgate platform 12. A width of each ramp is nearly half of the width W of the tailgate platform, and any gap left between the two ramps is small enough so as to be confidently and safely spanned by the drive track width of a conventional snowmobile.

To load the ATV or snowmobile into the cargo bed, it is driven up the ramp and onto the tailgate and cargo bed platforms 10, 12, and pulled as far ahead toward the front wall of the cargo bed as possible. In most, if not all, cases, the length of the ATV or snowmobile will exceed the cargo bed platform length $L_C$, or at least exceed an available length of open space $L_S$ of the cargo bed platform when the tailgate platform is stowed, which is calculated as $L_S=L_C-L_T$, where $L_T$ is the length of the tailgate platform, as measured between the connected and free ends 26, 28 thereof. Accordingly, after driving the ATV or snowmobile up onto the cargo bed platform 10, the tailgate of the truck is left open and the tailgate platform 12 remains in the deployed position resting on the topside of the open tailgate. The ATV or snowmobile is secured in this parked position atop the two platforms by way of suitable tie-downs (e.g. ratchet straps) securing it to the cargo platform and/or to the pickup truck.

When no ATV or snowmobile is parked in the cargo bed, the tailgate platform 12 may be stowed, thus allowing the tailgate to be closed without having to remove the platforms from the truck entirely. Usable cargo space in the cargo bed remains available atop the cargo bed platform 10 at the open space thereof that resides forwardly of the stowed tailgate platform 12, as shown in FIG. 5.

The construction of the cargo bed platform 10 features two elongated track assemblies 30, each of which comprises a support framework 32 defining a base that sits atop the floor of the cargo bed, and a rectangular flat deck board or deck plate 34 sitting horizontally atop the framework 32 at a height above the floor of the cargo bed. A width $W_D$ of each deck matches that of the underlying framework 32, and is less than half the width $W_P$ of the overall platform 10, whereby an empty space is left on the cargo bed floor between the two track assemblies 30 in the transverse direction in which the width dimensions are measured. A plurality of crossbars 36 span between the two track assemblies 30 in the transverse direction overtop of the space between the track assembly at spaced apart positions along the cargo bed platform length $L_C$. Each crossbar 36 is bolted or otherwise fastened to the topside of each deck 34.

The length of each cross-bar is less than the platform width $W_P$, and so each crossbar stops short of an outer half of each deck plate 34 that resides nearest the respective side wall of the cargo bed. On this outer half of each deck plate, a plurality of low-friction slide members 38 are mounted to the topside of the deck plate 34 at spaced apart positions along the cargo bed platform length $L_C$. In the illustrated embodiment, the slide members 38 on each deck plate 34 span a greater portion of the deck width $W_D$ than the crossbars 36. The spacing apart of the two sets of slide members 38 in the width transverse direction is such that the skis of typical commercially available snowmobiles will ride atop these slide members 38 on the deck plates, while the drive track of the snowmobile will ride on the crossbars 36 that extend across the open space between the deck plates 34. The slide members 38 provide a low-friction surface for the snowmobile skis to slide over, and preferably comprise longitudinal ridges that are spaced apart from one another in the transverse direction to provide grooves through which the longitudinal wear bars or inserts on the underside of the skis can glide. Suitable slide members of this type are commercially available as Grip Glides™ from Caliber Products Inc. of Burnsville, Minn.

The general form of the tailgate platform 12 matches that of the cargo bed platform, in that it features two deck assemblies 30 that are made up of support frames 32 and deck plates 34, are interconnected by crossbars 36 and feature slide members 38 on the outer halves of the deck plates. The deck assemblies of the tailgate platform 12 differ from those of the cargo bed platform 10 in that the tailgate deck assemblies are shorter in length, and the crossbars and slide members of the tailgate platform are accordingly lesser in number than those of the cargo bed assembly. As best seen in the detail view of FIG. 5, the cross member 36*a* at the rear end 28 of the cargo bed platform is connected to the cross-member 36*b* at the connection end 26 of the tailgate platform 12 by a hinge 40 in order to form the pivotal connection between the two platforms.

Turning now to FIGS. 6 to 9, each deck assembly 30 of the cargo bed platform 10 features an extendable/retractable extension rod 42 that is connected to an inside wall 32*a* of the support frame 32 that faces toward the support frame of the other deck assembly across the open space between these deck assemblies. Particularly, the extension rod 42 is connected to the outer side of the inside wall 32*a* so as to reside inside the support framework 32 of the respective deck assembly beneath the deck plate 34 thereof. The use of a hollow base or skeletal support frame for each deck assembly thus accommodates the extension 42 in a manner that does not occupy an open space between the deck assemblies that is spanned overhead by the cross-bars 36, thereby leaving this space open for storage of the ramp members 14 therein, as described herein further below.

Figure 6:
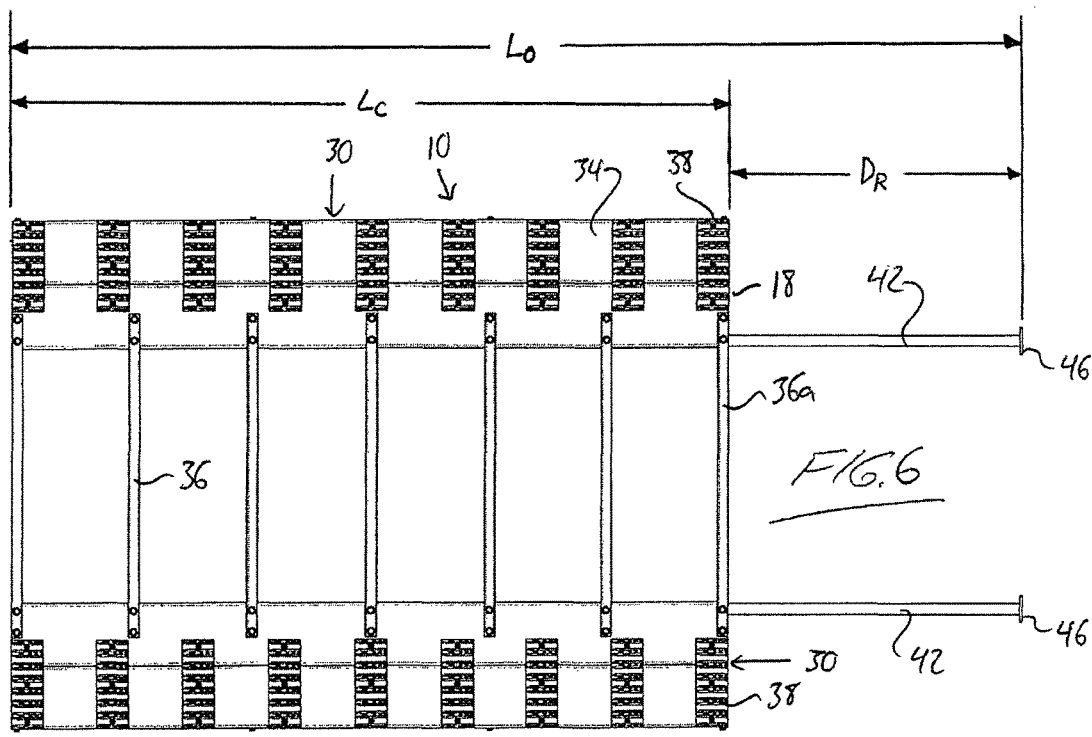
FIG. 6 is an overhead plan view of the cargo bed platform with adjustable extension rods thereof in a fully extended state maximizing the overall effective length of the cargo bed platform for use in larger-sized pickup trucks.
Figure 7:
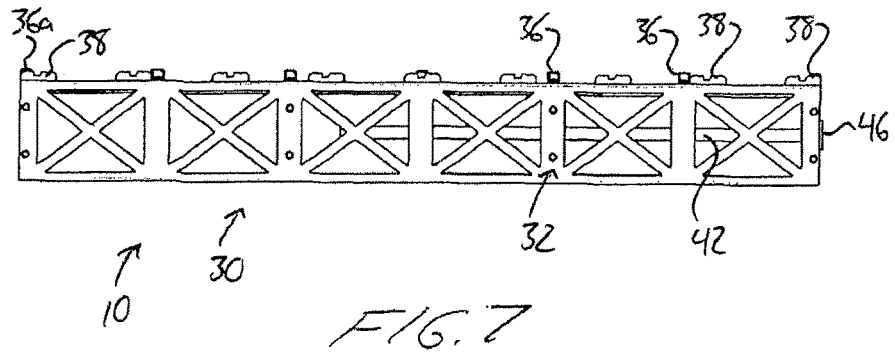
FIG. 7 is a side elevational view of the cargo bed platform with the adjustable extension rods in a fully retracted state minimizing the overall length of the cargo bed platform for use in smaller-sized pickup trucks.
Figure 8:
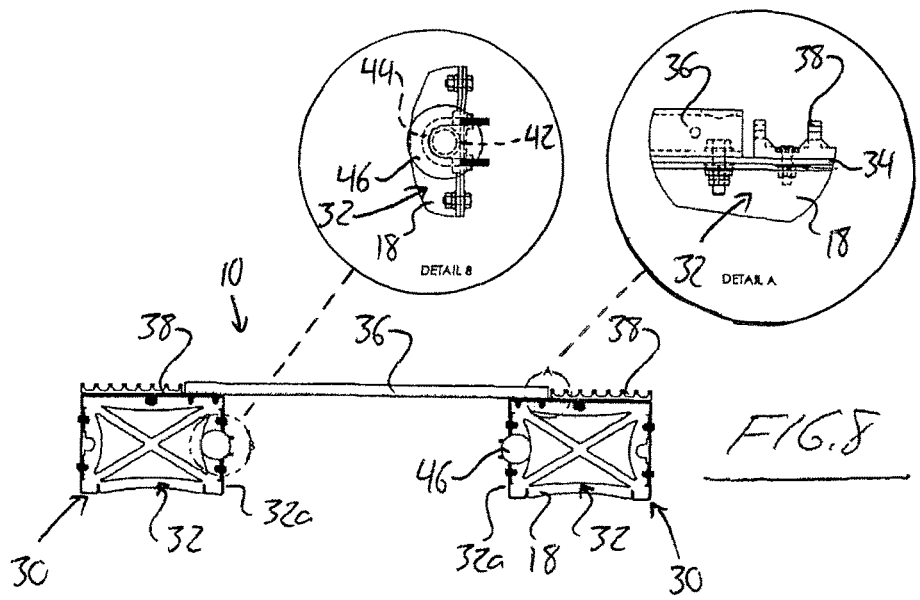
FIG. 8 is a front-end elevational view of the cargo bed platform of FIG. 7.
Figure 9:
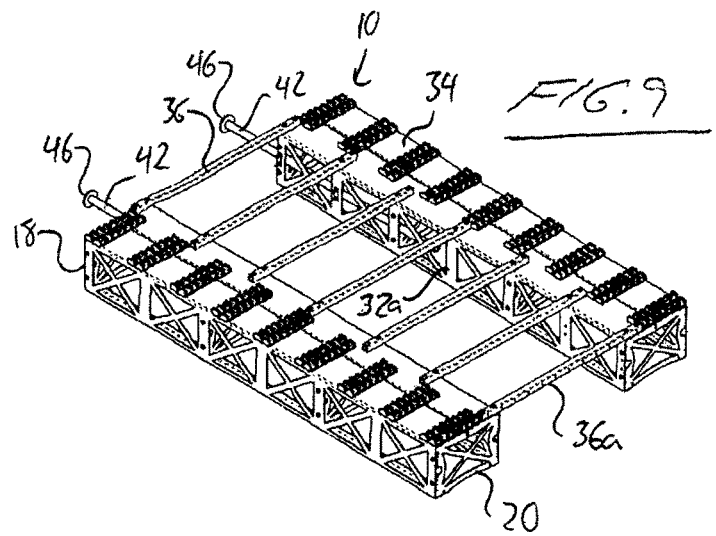
FIG. 9 is a perspective view of the cargo bed platform with the adjustable extension rods thereof in a partially extended state providing an intermediate overall length of the cargo bed platform for use in a medium-sized pickup truck.
Figure 10:
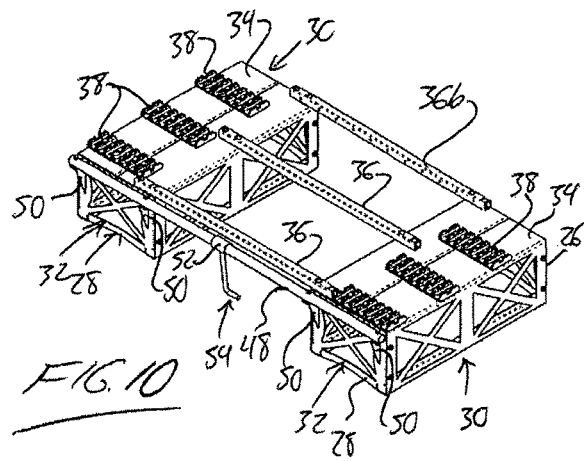
FIG. 10 is a perspective of the tailgate platform.
Figure 11:
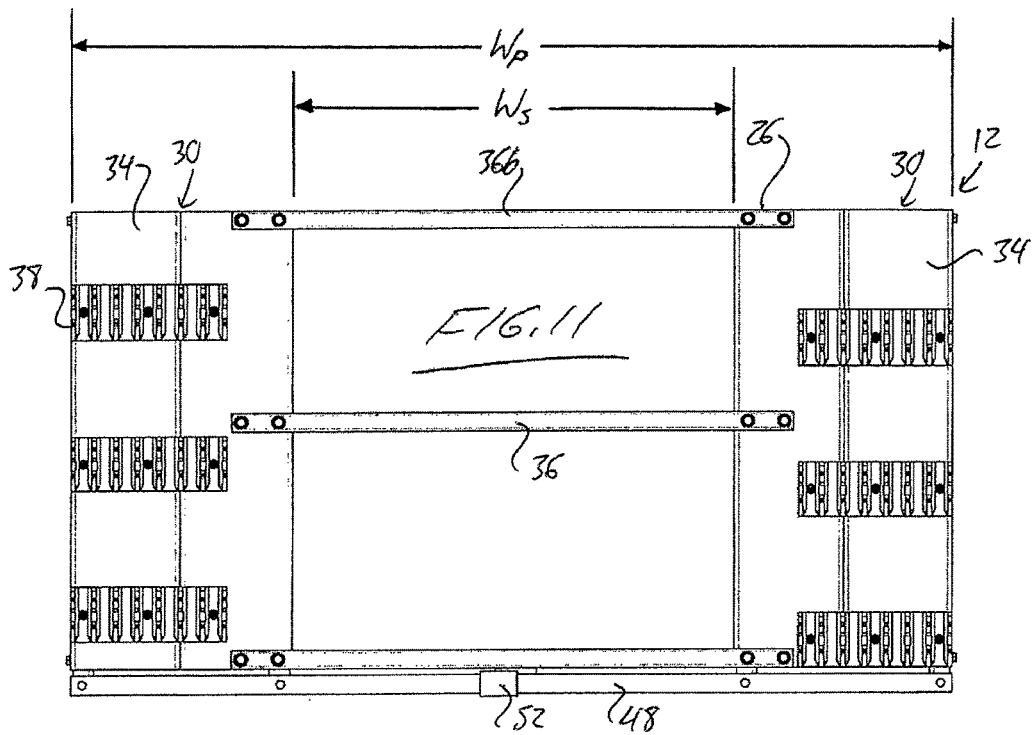
FIG. 11 is an overhead plan view of the tailgate platform.

The extension rod 42 is slidable back and forth in the longitudinal direction in which the length $L_C$ of the platform is measured. As best shown in Detail B of FIG. 8, the extension rod 42 is supported on the inside wall of the support frame 32 at two or more spaced apart locations in the longitudinal direction by respective U-bolts 44 inserted through the inside wall 32*a* of the support frame 32 at these locations. At a front end of each extension rod 42, a flat abutment plate or disk 46 is fixed to the rod, for example by welding, and lies in a plane perpendicular to the longitudinal axis of the rod 42. FIG. 7 shows each extension rod 42 in a fully retracted state in which the abutment plate 46 resides at the front end 18 of the cargo bed platform assembly 10. FIG. 6 shows each extension rod in a fully extended state reaching a notable maximum distance forwardly outward from the front end 18 of the cargo bed platform assembly 10. An overall effective length $L_O$ of the cargo bed platform assembly is calculated as the distance $D_R$ by which the extension rods reaches outward from the front end 18 of the cargo bed platform 10 plus the cargo bed platform length $L_C$ ($L_O = L_C + D_R$). The extendable/retractable adjustment rods 42 are used to set this overall length $L_O$ to match the cargo bed length of the truck on which the apparatus is being installed, whereby with the abutment plates 46 pushed up against the front wall of the cargo bed, the rear end 20 of the cargo bed platform 10 will reside immediately adjacent the tailgate area of the cargo bed. To lock the extension rods 42 at this appropriate length for the attributes of the given pickup truck, the installer tightens the U-bolts 44 in order to hold the extension rods in fixed positions relative to the deck assemblies 30 of the cargo bed platform 10.

Referring to FIG. 18, with the overall effective length of the cargo bed platform assembly set according to the cargo bed length of the pickup truck, and the adjustable extension rods 42 locked in place, the cargo bed platform assembly and attached tailgate platform are installed on the pickup truck simply by placing the support frames 32 of the cargo bed platform atop the floor 102 of the cargo bed 100, then tying the support frame 32 of each deck assembly 30 of the cargo bed platform 10 to tie-down anchor points 104 at the front end of the cargo bed, and tensioning this tied connection so as to pull the cargo bed platform forwardly in order to firmly force the abutment plates 46 of the extension rods 42 up against the front wall 106 of the cargo bed. To ensure the cargo bed platform is tightly and confidently secured in this position, ratchet straps 107 are preferably used as the tying members that secure the cargo bed platform in place. Particularly, a ratchet strap 107 is hooked to a respective anchor point 104 on the truck, for example at the front cargo bed wall 106, and fed transversely through the support frame of the respective deck assembly at a distance rearward from this anchor point so as to hook around an upright of the support frame 32. Use of a respective tie down for each deck assembly avoids having to feed the tie-down across the space that is left open between the two support frames 32, thus leaving this space open for storage of the ramp members, as described herein below. By use of the extension rods to adjust the apparatus to the particular cargo-bed length of the truck concerned, the apparatus can thus be removably installed using only ratchet straps or other simple tie downs, thus avoiding the need for any modification or customization of the truck.

Turning to FIGS. 10 to 13, in addition to its two deck assemblies 30 and the cross-bars 36 spanning therebetween overtop of a space left between the two deck assemblies, the tailgate platform 12 features an additional cross-member 48 at the free end 28 thereof. In the illustrated embodiment, this cross-member 48 is provided in the form of a length of circular rod or pipe that is bolted or otherwise fastened in place atop a set of support gussets 50 that are fixed to the support frames 32 of the two deck assemblies 30 of the tailgate platform 12 at the free end 28 thereof. A cylindrical sleeve 52 is slidably disposed on the cross-member 48 and is displaceable back and forth therealong in the transverse direction across the space between the two deck assemblies of the tailgate platform 12. The cross-member 48 lies an elevation generally matching that of the deck plates 34 of the two deck assemblies 30 of the tailgate platform 12, with only the crossbars 36 and slide members 38 reaching slightly upward beyond the elevation of the cross-member 48. An L-shaped hook member 54 is fixed to the sliding sleeve 52, and has a first leg 54*a* hanging downward therefrom and a second leg 54*b* extending horizontally from the lower end of the first leg 54*a* toward a respective one of the two deck assemblies 30. The purpose and operation of the assembled sleeve 52 and hook 54 are described herein further below.

Turning to FIGS. 14-17, which show one of the two ramp members 14 of FIG. 1, each ramp member 14 features two linear side rails 60 that lie parallel to one another and are perpendicularly interconnected at spaced apart positions therealong by respective cross rails 62 that are fastened to the top sides of the side rails 60, whereby each ramp member has an open-frame structure of generally ladder-like form. At a loading end 14*a* of the frame, each ramp member features an end plate 64 that spans between the two sides rails 60 at the ends thereof, which are cut at an angle so that the end plate 64 extends obliquely between the top and bottom sides of the two side rails 60. At a central point between the two side rails 60, a wing bolt 66 passes through the end plate 64, with a head of the wing bolt 66 on the side thereof that faces toward the opposing end 14*b* of the ramp member 14. On either side of the wing bolt 66, the end plate 64 feature a curved upper portion of downwardly-opening arcuate curvature, which forms a hook 64*a* for engaging over a topside of the round cross-member 48 of the tailgate platform 12 in order to hook the ramp member 14 to the tailgate platform at the free end 28 thereof.

An access end 14*b* of the ramp member lying opposite the loading end 14*a* thereof features a piece of triangular tubing 68 spanning between the two side rails 60 with one of its three flat sides fixed to flat-ends of the side rails 60 so that the tubing's cross-section tapers to a narrowed point that lies opposite to the piece's attachment to the side rails. Accordingly, when the hooked plate 64 at the loading end 14*a* of the ramp member 14 is hooked to the tailgate platform 12, and the access end 14*b* of the ramp member 14 is set on the ground, the pointed extent of this triangular cross-member 68 forms a more gradual transition from the ground up onto the ramp. At an intermediate point between the two side rails 60, the triangular cross-member 68 has a short length of cylindrical pipe 70 fixed to the narrow pointed end thereof in an orientation placing the cylinder's central axis parallel to the axis of the tubing 68 and the axes of the cross-rails 62. Other embodiments may lack the tapered transition at the ends of ramps, as the relatively small thickness of each ramp does not provide a significant impedance to riding of a conventional snowmobile or ATV over the squared-off end of such a taper-free ramp.

Looking down a length $L_R$ of each ramp from the access end 14*b* thereof to the loading end 14*a*, one half of each cross-rail 62 features a respective slide member 38*a* mounted thereatop, and the other half is left exposed without any such slide member installed thereon. The slide members 38*a* of the ramp members 14 are of the same general type as that described for the platforms, but with a rectangular cut-out in the bottom thereof for mounting to the rectangular-tubing cross-rails 62 of the ramp member. Again, such slide members are commercially available as part of the Grip Glide™ product line from Caliber Products Inc. A single slide member 38 of the same flush-mount type used on the deck plates 34 of the platforms 10, 12 is mounted atop the triangular tubing 68 at the access end of the ramp member in a position aligned with the sliding members 38*a* found atop the cross-rails 62.

While the slide members 38, 38*a* on the platforms and ramps of the illustrated embodiment are small pads mounted at discretely spaced positions along the platform/ramp length, other embodiments may feature longer pads that span a substantial entirety of the platform/ramp length in a substantially continuous manner, whether by way of a singular elongated pad of generally equal length to the respective platform or ramp, or by way of a plurality of elongated pads placed end-to-end in close or touching relationship to span the substantial entirety of the platform/ramp length.

FIGS. 14 to 17 show the left one of the two ramp members shown in FIG. 1, on which the slide members 38*a* are mounted on the left side of each cross-rail 62 when looking from the access end 14*b* to the loading end 14*a*. The other ramp member has its slide members 38*a* on the right side of each cross-rail 62, whereby in FIG. 1, the slide members 38*a* on the two ramp members are situated adjacent the outside edges of the installed ramp members 14 residing side by side at the free end of the tailgate platform. This places the slide members of the ramp members 14 respectively in-line with the slide members of the two deck assemblies 30 of each platform 10, 12.

However, either ramp member 14 can be hung on the cross-member 48 of the tailgate platform 12 at either one of the two deck assemblies thereof, whereby the two ramp assemblies 14 are interchangeable with one another. Accordingly, reversal of the two ramp member positions shown in FIG. 1 would result in the two sets of slide members on the ramp members being situated at the inner edges of the two ramp members, i.e. offset out of alignment with the slid members of the platforms 10, 12, and more in-line with the cross-members 36 of the platforms 10, 12. In the illustrated ramp member positions of FIG. 1, the slide members on the ramps are situated to underlie the skis of a snowmobile in order to reduce friction therewith and damage thereto, whereas the reverse configuration would place the exposed halves of the ramp member cross-rails 62 at the outside of the two ramp members, which may be preferable when loading an ATV, as the rails 62 themselves may provide better wheel traction than the low-friction material of the slide members 38.

The length $L_R$ of each ramp member 14, 16 is less than or approximately equal to the combined lengths $L_C+L_T$ of the cargo bed platform 10 and tailgate platform 12, and the width $W_R$ of each ramp member measured between the outside edges of the two side rails 60 in the transverse direction perpendicular to the length ramp length $L_R$ is slightly less than the width $W_S$ of the space between the two deck assemblies 30 of each platform 10, 12. Accordingly, the cargo bed space located between the two deck assemblies of the cargo bed platform 10 and the tailgate space located between the two deck assemblies of the deployed tailgate platform 12 cooperate to collectively define a storage space in which each ramp member 14 can be stored when not in use. A thickness of each ramp member 14, measured from the plane of the undersides of the two side rails 60 to the parallel plane at the tops of the slide members 38*a* is less than half of the height of the support frames 32 of the two platforms, whereby the height of the storage space from the plane of the cargo bed floor to the undersides of the platform cross-bars 36 is more than twice the ramp thickness. Accordingly, one ramp member 14 can be stacked atop the other within the storage space, as is shown in FIGS. 3 and 4.

FIG. 4, particularly in Detail B thereof, shows how the L-shaped hook 54 of the tailgate platform 10 cooperates with the cylindrical pipe 70 on the access end of the bottom one of the two stacked ramp members 14 in order to retain the ramp members 14 in this stored position between the deck assemblies 20 of the platforms 10, 12. This prevents sliding of the ramp members 14 out of the cargo bed of the pickup truck through the open tailgate space. At least the bottom one of the two stacked ramp members 14 in the storage space is inserted loading-end-first, so that the access end 14*b* lies at the free end 28 of the deployed tailgate platform 12. The hanging length of the L-shaped hook 54 from the sliding sleeve 52 on the cross-member 48 that spans overtop of the storage space at the free end 28 of the tailgate is such that the horizontal leg 54b of the hook is at an elevation matching that of the cylindrical pipe 70 on the bottom one of the stacked ramp members 14. The sleeve 52 and attached hook 54 are thus slidable on the cross-member 48 in order to move the horizontal hook leg 54b into and out of the cylindrical pipe 70 on the bottom ramp member 14. The length of the horizontal hook leg 54b exceeds the axial length of the cylindrical pipe so as to reach fully therethrough.

Figure 12:
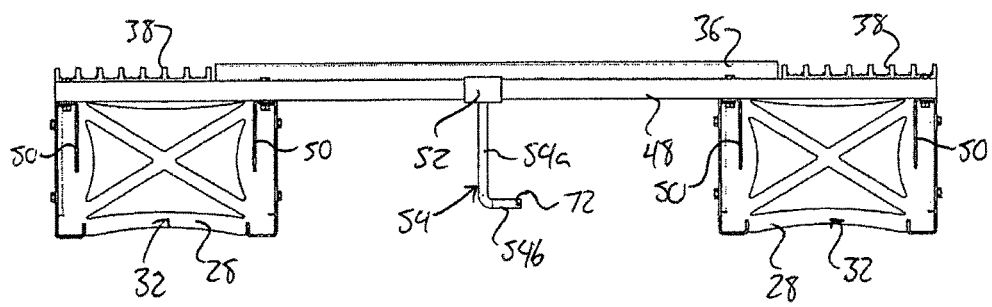
FIG. 12 is an end view of the tailgate platform.
Figure 13:
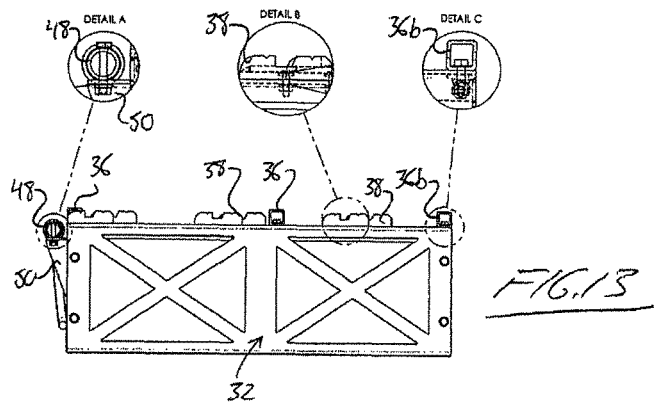
FIG. 13 is a side elevational view of the tailgate platform.
Figure 14:
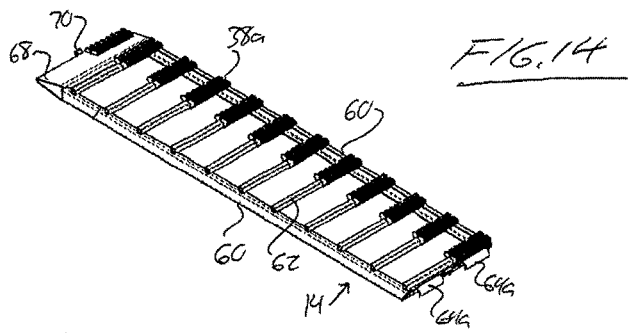
FIG. 14 is a perspective of one of the ramp members.
Figure 15:
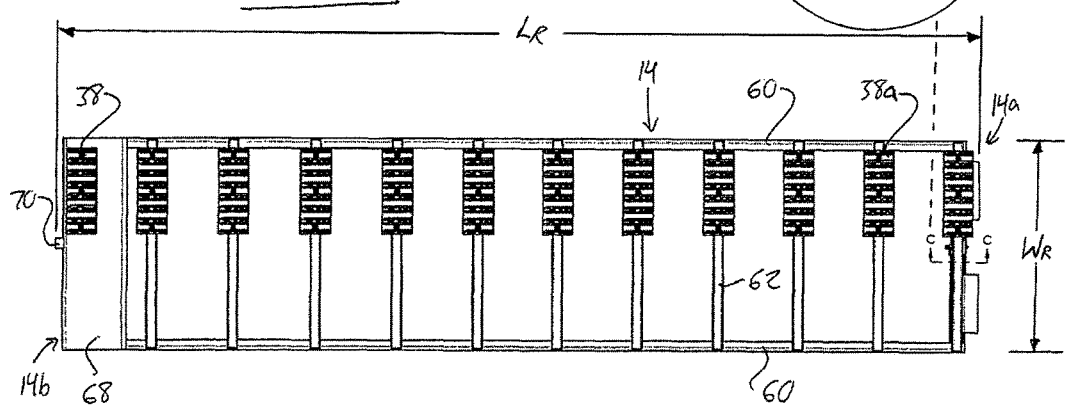
FIG. 15 is an overhead plan view of the ramp member of FIG. 14.

As best shown in FIG. 12, a cross-bore 72 in the horizontal hook leg 54b passes therethrough near the distal end thereof furthest from the hanging leg 54a of the hook 54. With the horizontal hook leg 54b reaching fully through the cylindrical pipe 70, a cotter pin or other locking pin having a length greater than the diameter of the pipe 70 can thus be inserted through the cross-bore 72 in the hook 54 in order to block withdrawal of the hook 54 from the pipe 70. Such action therefore couples the hook 54 to the pipe 70 in its engaged position reaching fully through the opening of the pipe 70, thus securing the bottom one of the two stacked ramp members to the tailgate platform 12. In this locked condition of the hook 54, the hanging leg 54a of the hook 54 spans downwardly past the end of the top one of the stacked ramp members 42, whereby sliding of the top ramp member out of the storage space is also prevented.

Figure 19:
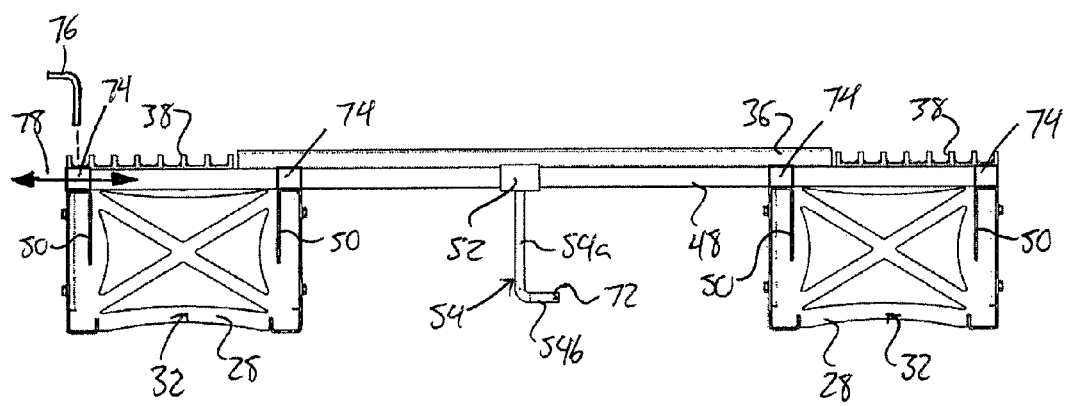
FIG. 19 shows an end view of the tailgate platform in a variant of the loading apparatus, where a cross-bar for connecting the ramps to the tailgate platform in slidable into and out of a position spanning across an upper area of the ramp storage space.

FIG. 19 shows a variant of the apparatus in which the cross-member 48, rather than being rigidly bolted or otherwise affixed to the gussets 50 in an immovable manner like in the other figures, is instead slidably received through a series of ring-shaped sleeves 74 each welded or otherwise affixed atop a respective one of the gussets 50. A lock pin 76 is passable through a vertical through-bore in one of the sleeves and through a diametrically oriented through-bore in the cross-member, which aligns with the through-bore of the sleeve in the cross-bar's normal position spanning across the top area of the opening to the ramp storage space at the rear end of the tailgate platform. Removal of the lock pin 76 enables sliding of the cross-member into and out of this normal position, as denoted by arrow 78. This is useful in embodiments where the stacked height of the stored ramp members exceed the available height between the floor of the cargo bed and the cross-member 48. Accordingly, to enable insertion of the ramp members into the storage space, the lock pin 76 is withdrawn, and the cross-member 48 is slid through the sleeves 74 in a transverse direction withdrawing it from its normal position spanning across the upper area of the storage space opening. Once the ramp members are received in the storage space, the cross-member is slid back across the storage space opening, and secured in place with the lock pin 76. The top ramp member is blocked from exiting the storage space by the cross-member's locked normal position, and the hook member 54 is once again engagable with the bottom ramp member to prevent exit thereof from the storage space.

In both FIGS. 12 and 18, the apparatus thus provides its own built in functionality for securing the ramp members within the storage space without requiring use of any separate tie-downs. Anytime the tailgate is open and the tailgate platform is deployed, the ramp members can be stored in this space, regardless of whether or not the topside of the platforms are occupied by a snowmobile, ATV, or other cargo. When the apparatus is not expected to be needed for loading or unloading operations, the ramps can be removed from the pickup truck, and for example stored in the vehicle owner's garage or shed until next needed, but the hassle of having to remove the platforms from the truck and find notable storage space for same can be avoided, by simply flipping the tailgate platform into the stowed position, and closing the tailgate (and optional tonneau cover) of the truck.

Since various modifications can be made in my invention as herein above described, and many apparently widely different embodiments of same made within the scope of the claims without departure from such scope, it is intended that all matter contained in the accompanying specification shall be interpreted as illustrative only and not in a limiting sense.

The invention claimed is:

1. A loading apparatus for use in loading and unloading a tailgate-equipped cargo bed of a pickup truck, the apparatus comprising:

a cargo bed platform (10) dimensioned to fit within the cargo bed of the pickup truck with a front end of said cargo bed platform residing adjacent an operator cabin of the pickup truck, a rear end of said cargo bed platform residing adjacent a tailgate of the cargo bed of said pickup truck, and opposing sides of the cargo bed platform residing respectively adjacent opposing side walls of the cargo bed of said pickup truck, the cargo bed platform having a cargo bed platform length measured between said front and rear ends thereof in a longitudinal direction and a cargo bed platform width measured between said opposing sides of the cargo bed platform in a transverse direction perpendicular to said longitudinal direction;

a tailgate platform (12) having a connection end that is coupled to the rear end of the cargo bed platform by a pivotal connection (40) that defines a pivot axis (P) parallel to the width dimension of the cargo bed platform, and a free end disposed opposite the connection end, the tailgate platform being pivotal about the pivot axis relative to the cargo bed platform between a stowed position overlying the cargo bed platform and a deployed position forming an extension of the cargo bed platform that reaches from the rear end thereof in the longitudinal direction;

whereby the tailgate platform is storable in the cargo bed of the pickup truck in the stowed position with the tailgate closed when the loading apparatus is not in use, and is pivotally deployable from the stowed position into a deployed position residing atop the tailgate when opened, whereupon placement of one or more ramp members in a useable position sloping upward to the tailgate platform from the ground prepares the pickup truck for loading or unloading of the cargo bed.

2. The loading apparatus of claim 1 further comprising a pair of ramp members (14, 16) that are each connectable to the free end of the tailgate platform, wherein the cargo bed platform comprises two track assemblies spaced apart from one another in the transverse direction to create a cargo bed space therebetween, the tailgate platform comprises two deck assemblies spaced apart from one another in the transverse direction to create a tailgate space therebetween, and, with the tailgate platform in the deployed position, the cargo bed space and the tailgate space combine to form a storage space that is sufficiently sized to receive the pair of ramp members therein.

3. The loading apparatus of claim 1 further comprising a pair of ramp members (14, 16) that are each connectable to the free end of the tailgate platform and each have a ramp width and a ramp length, wherein the cargo bed platform comprises two track assemblies spaced apart from one another in the transverse direction to create a cargo bed space therebetween, the tailgate platform comprises two deck assemblies spaced apart from one another in the transverse direction to create a tailgate space therebetween, and a width of each of the tailgate space and the cargo bed space is greater than the ramp width of each ramp member, whereby the cargo bed space and the tailgate space combine to form a storage space that accommodates said ramp members when the tailgate platform is deployed.

4. The loading apparatus of claim 3 wherein a height dimension of each of the tailgate space and the cargo bed space is at least two times greater than a ramp thickness of each ramp member that is measured perpendicular to the ramp width and perpendicular to the ramp length, whereby the storage space accommodates receipt of the ramp members in a stacked configuration one atop the other.

5. The loading apparatus of claim 2 comprising a retaining member (54) connected to the tailgate platform at the free end thereof and selectively movable into an out of a useful position for maintaining the ramp members within the storage space once placed therein.

6. The loading apparatus of claim 5 wherein the retaining member comprises a coupling feature (54b) for connecting to at least one of the ramp members when received in the storage space.

7. The loading apparatus of claim 6 wherein the coupling feature is arranged to connect to a lower one of the two ramp members when stacked atop one another within the storage space, with the retaining member spanning downward past an upper one of the stacked ramp members to connect to the lower one of the stacked ramp members, thereby blocking the upper one of the stacked ramp members from sliding off the lower one of the stacked ramp members.

8. The loading apparatus of claim 6 wherein the retaining member comprises a hook hanging downwardly from a cross-member (48) that spans over the tailgate space of the tailgate platform for engagement through a cooperating hook-receiving opening on one of the ramp members.

9. The loading apparatus of claim 8 wherein the hook is movably connected to the cross-member for movement into and out of a position engaging the cooperating hook-receiving opening.

10. The loading apparatus of claim 9 wherein the hook is an L-shaped member attached to a sliding collar (52) that is slidable back and forth on the cross-member.

11. The loading apparatus of claim 8 wherein the cross-member is located at the free end of the tailgate platform and comprises a rounded topside, and each ramp member comprises at least one curved hook (64a) at a respective end thereof for engaging over the curved topside of the cross-member in order to hook the ramp member to the tailgate platform in the useful position sloping down to the ground from said free end of the tailgate platform.

12. The loading apparatus of claim 6 wherein the retaining member comprises a bore (72) for selectively receiving a lock pin for securing a connection of the coupling feature with the at least one of the ramp members.

13. The loading apparatus of claim 2 comprising a cross-member (48) connected to the tailgate platform at the free end thereof and slidably supported for movement back and forth thereacross in the transverse direction into and out of a lockable normal position spanning across an upper area of the tailgate space.

14. The loading apparatus of claim 1 further comprising at least one extendable/retractable extension (42) movably connected to the cargo bed platform and selectively displaceable back and forth in the longitudinal direction relative to said cargo bed platform to adjust a distance by which said extendable/retractable extension projects forwardly from the front end of the platform, thereby adjusting an overall effective length of the platform and connected extendable/retractable extension, whereby the overall effective length can be set to match a cargo bed length measured from a front wall of the cargo bed behind the operator cabin to a tailgate area of the cargo bed in order to place the rear end of the cargo bed platform at said tailgate area when the extendable/retractable extension is abutted against the front wall of the cargo bed.

15. The loading apparatus of claim 14 in combination with one or more securing members (106) each connectable between the cargo bed platform and a tie-down anchor (104) of the cargo bed in order to pull the platform toward the operator cabin and maintain abutment of the extendable/retractable extension against the front wall (106) of the cargo bed.

16. The combination of claim 15 wherein the one or more securing members comprise one or more ratchet straps.

* * * * *